US008554643B2

(12) United States Patent
Kortelainen

(10) Patent No.: US 8,554,643 B2
(45) Date of Patent: Oct. 8, 2013

(54) METHOD FOR PLACING A PALLETLESS GOODS PACKAGE IN A STOCK SHELF AND DELIVERING THEREFROM AND FOR CONTROLLING LOGISTICS OF PACKAGES

(75) Inventor: Sami Kortelainen, Tampere (FI)

(73) Assignee: Suomen Teollisuusosa Oy, Tampere (FI)

( * ) Notice: Subject to any disclaimer, the term of this patent is extended or adjusted under 35 U.S.C. 154(b) by 0 days.

(21) Appl. No.: 13/074,444

(22) Filed: Mar. 29, 2011

(65) Prior Publication Data

US 2011/0176895 A1 Jul. 21, 2011

Related U.S. Application Data

(62) Division of application No. 11/908,218, filed as application No. PCT/FI2006/000078 on Mar. 8, 2006, now abandoned.

(30) Foreign Application Priority Data

Mar. 9, 2005 (FI) .................................. 20050251
Aug. 22, 2005 (FI) .................................. 20050844

(51) Int. Cl.
G06Q 10/00 (2012.01)
(52) U.S. Cl.
USPC ............. 705/28; 414/277; 414/278; 414/279; 414/280; 414/281; 414/282; 414/283; 414/284; 414/285; 414/286; 414/799

(58) Field of Classification Search
None
See application file for complete search history.

(56) References Cited

U.S. PATENT DOCUMENTS

| | | | | |
|---|---|---|---|---|
| 3,094,225 A * | 6/1963 | Repasky et al. | ............ | 414/789.2 |
| 3,700,128 A * | 10/1972 | Noble et al. | ................... | 414/231 |
| 3,903,673 A * | 9/1975 | Grasvoll | .......................... | 53/535 |
| 4,030,618 A * | 6/1977 | Kelley et al. | ............... | 414/790.3 |
| 4,060,957 A * | 12/1977 | Birkenfeld et al. | ............. | 53/442 |
| 4,573,305 A * | 3/1986 | Wildmoser | ........................ | 53/466 |
| 4,850,783 A * | 7/1989 | Maekawa | ................... | 414/792.9 |
| 5,623,808 A * | 4/1997 | Franklin et al. | ................. | 53/399 |
| 6,079,939 A * | 6/2000 | Smets | ........................ | 414/798.5 |
| 6,129,497 A * | 10/2000 | Woodson et al. | ............. | 414/277 |
| 6,148,291 A * | 11/2000 | Radican | .......................... | 705/28 |
| 6,315,513 B1* | 11/2001 | Harukawa et al. | ............ | 414/286 |
| 6,622,854 B2* | 9/2003 | Coblentz | ....................... | 414/803 |
| 6,702,541 B1* | 3/2004 | Lee | ................................ | 414/253 |
| 6,714,121 B1* | 3/2004 | Moore | ......................... | 340/10.3 |
| 6,853,294 B1* | 2/2005 | Ramamurthy et al. | ....... | 340/10.1 |
| 7,149,753 B2* | 12/2006 | Lin | ....................................... | 1/1 |

(Continued)

Primary Examiner — Fateh Obaid
(74) Attorney, Agent, or Firm — Stites & Harbison PLLC; Douglas E. Jackson

(57) ABSTRACT

A method and equipment to stack palletless and as to their size variable packages (1) on warehouse rack (15) and to retrieve them from the rack and to control the logistics of packages, in which the warehouse rack is furnished with an automatic packages stacking and retrieving robot, and in which the control of warehouse data and logistics takes place by a data system. Equipment (5) receives package (1), for instance, onto conveyor belt (2), equipment (5) carries out weighing of package (1), determination for the necessary space requirement, reading of remote code connected to package (1), as RFID code (20) in order to choose the rack space determined for it on basis of previous functions, and package (1) is retrieved from the rack steered either by the order of the user or of the data system, and the data from above mentioned stacking and retrieving functions are transmitted to the data system.

3 Claims, 3 Drawing Sheets

(56) References Cited

U.S. PATENT DOCUMENTS

| | | | |
|---|---|---|---|
| 7,233,958 B2* | 6/2007 | Weng et al. | 707/693 |
| 7,277,866 B1* | 10/2007 | Or-Bach et al. | 705/28 |
| 7,548,166 B2* | 6/2009 | Roeder et al. | 340/572.7 |
| 7,633,379 B2* | 12/2009 | Jenney et al. | 340/10.5 |
| 2002/0156642 A1* | 10/2002 | Aida | 705/1 |
| 2003/0122673 A1* | 7/2003 | Anderson | 340/568.7 |
| 2003/0126037 A1* | 7/2003 | Begle | 705/26 |
| 2003/0158857 A1* | 8/2003 | Weng et al. | 707/104.1 |
| 2003/0171962 A1* | 9/2003 | Hirth et al. | 705/7 |
| 2003/0227392 A1* | 12/2003 | Ebert et al. | 340/825.49 |
| 2004/0193641 A1* | 9/2004 | Lin | 707/104.1 |
| 2005/0251431 A1* | 11/2005 | Schmidtberg | 705/6 |
| 2005/0288977 A1* | 12/2005 | Mayer et al. | 705/7 |
| 2006/0080338 A1* | 4/2006 | Seubert et al. | 707/100 |
| 2006/0085450 A1* | 4/2006 | Seubert et al. | 707/100 |
| 2006/0255950 A1* | 11/2006 | Roeder et al. | 340/572.7 |
| 2007/0135961 A1* | 6/2007 | Ishida et al. | 700/213 |
| 2007/0150387 A1* | 6/2007 | Seubert et al. | 705/31 |
| 2008/0281717 A1* | 11/2008 | Kortelainen | 705/26 |

* cited by examiner

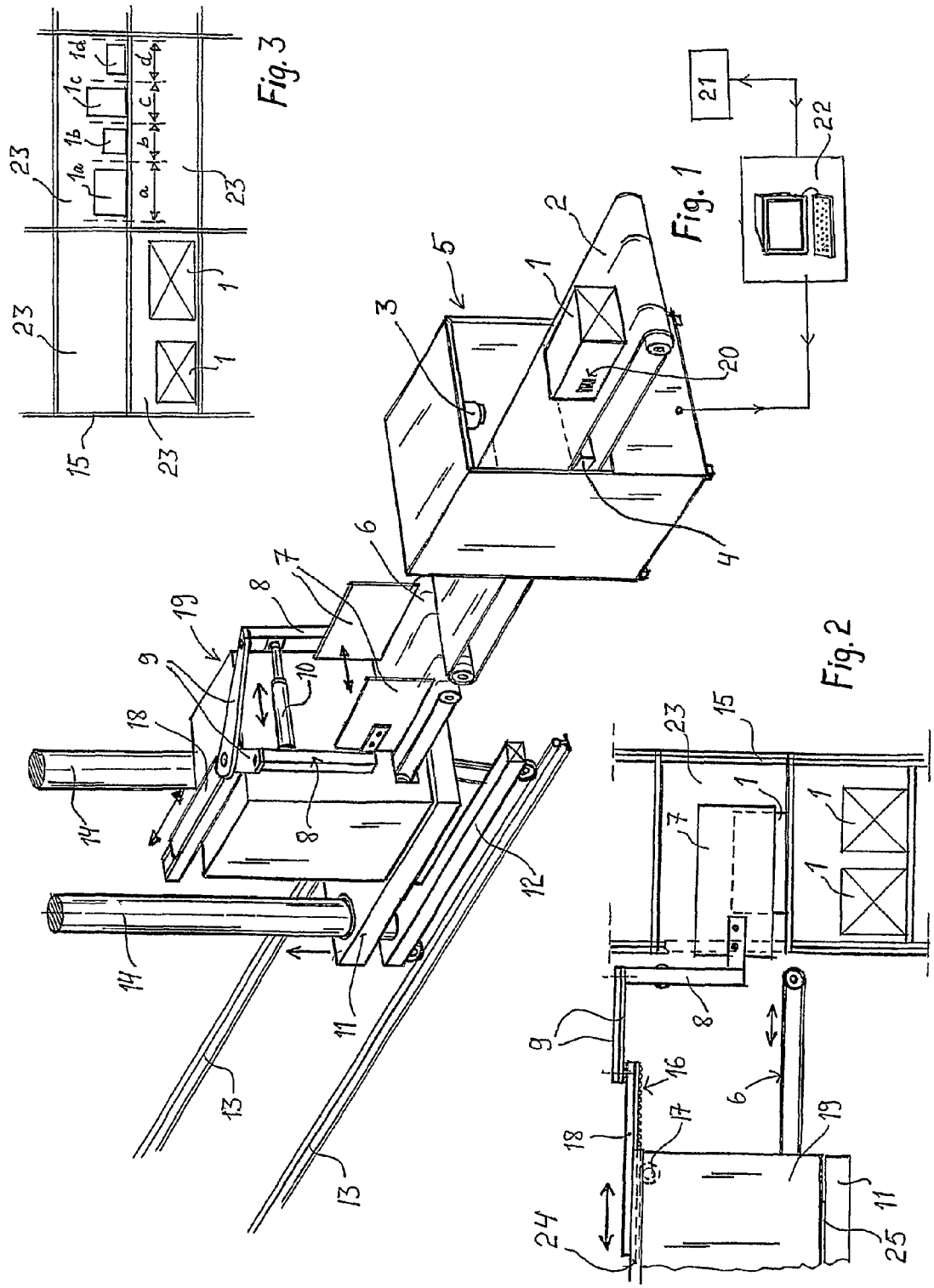

METHOD FOR PLACING A PALLETLESS GOODS PACKAGE IN A STOCK SHELF AND DELIVERING THEREFROM AND FOR CONTROLLING LOGISTICS OF PACKAGES

CROSS REFERENCE TO RELATED APPLICATIONS

This application is a divisional of application Ser. No. 11/908,218 filed May 6, 2008, now abandon which is the National Stage of International Application No. PCT/FI2006/000078, filed Mar. 8, 2006 (which is hereby incorporated by reference).

FIELD OF THE INVENTION

The invention relates to a method to stack palletless and as to their size variable goods packages into the warehouse rack and to retrieve them from said rack and to control the logistics of packages, in which method the said warehouse rack is furnished with an automatic packages stacking and retrieving robot, and in the method the control of warehouse data and logistics takes place by means of a data system, and to equipment that carries out the method.

BACKGROUND OF THE INVENTION

Previously known is a palletless storing system of goods, among others from U.S. patent publication. 6129497, where palletless goods crates stacked, one on top of another, are retrieved from the warehouse rack and stacked on the rack. A collecting apparatus is moving on rails in the warehouse, which apparatus is adjusted to take and stack goods crates on different rack levels. On a rack there can be many stacks of crates side by side. The stack retrieved from the rack so that the lifting means of the stacking apparatus catches the bottom-edge of he lower crate in the stack, whereby the whole stack can be lifted on and removed together with the apparatus. The crates are on the rack so that the lifting means can be placed under their edges. This has been resolved so that the crates on the rack are on a smaller base than their bottom part.

With the apparatus it is possible to handle other than crates of a certain size, which are stacked one on top of another, a certain quantity at the most. Anyway, no bearing pallets are needed. Steering of the apparatus takes place from the control centre in the lifting carrier. In the system the content of crates is not identified.

BRIEF SUMMARY OF THE INVENTION

In order to eliminate the disadvantages of the above presented wagon moving and working in a high warehouse collecting and removing palletless goods packages, a new method of stacking and retrieving pallet free packages from the rack is developed and a method to control the logistics of packages, whereby the method is characterised in that the equipment of the method receives the package, for instance, onto a conveyor belt, the equipment carries out weighing of package, determination of space requirement, reading of remote code connected to the package, as reading of RFID code onto the package in order to choose the rack space determined on basis of former stages and the package is retrieved from the rack controlled either by the order of the user or the data system and that data of above mentioned stackings and retrieving are transmitted to the data system.

Characteristic for the equipment that carries out the method is that the tracking and retrieving robot has at least an encapsulated upper part so that possible encapsulations of the lower part together with the upper part encapsulation essentially close the lower part package space, at least the sides and the bottom, when the lower part is lifted into contact with the upper part, furthermore the lower part has a transport platform to facilitate moving of package, and detectors in said lower part at least for observation of package.

The advantage of the method according to the invention is that the data base of the system remains up to date in real time and to the to its contents, since the packages travel through weighing and photography into the racks. Keeping the data base updated results in plenty of other advantages, such as possibility, in connection with completion storage, of automatic delivery of orders and for instance follow-up of the age of goods. From the reception of goods a photograph and weight data arrives to the data base, which can be checked later on. The robot stacking and retrieving packages is so arranged that it can take and move packages regardless of their form and outer dimensions provided that they do not exceed the top limit

BRIEF DESCRIPTION OF THE SEVERAL VIEWS OF THE DRAWINGS

In the following, the invention is disclosed with reference to the enclosed drawing, where:

FIG. 1 shows the reception and delivery station in a stacking and retrieving warehouse and the automatic stacking and retrieving robot moving in the warehouse.

FIG. 2 shows from the side a goods package getting stacked, into the rack.

FIG. 3 shows a part of the warehouse rack from the direction of goods retrieval.

DETAILED DESCRIPTION OF THE INVENTION

Figure 4:
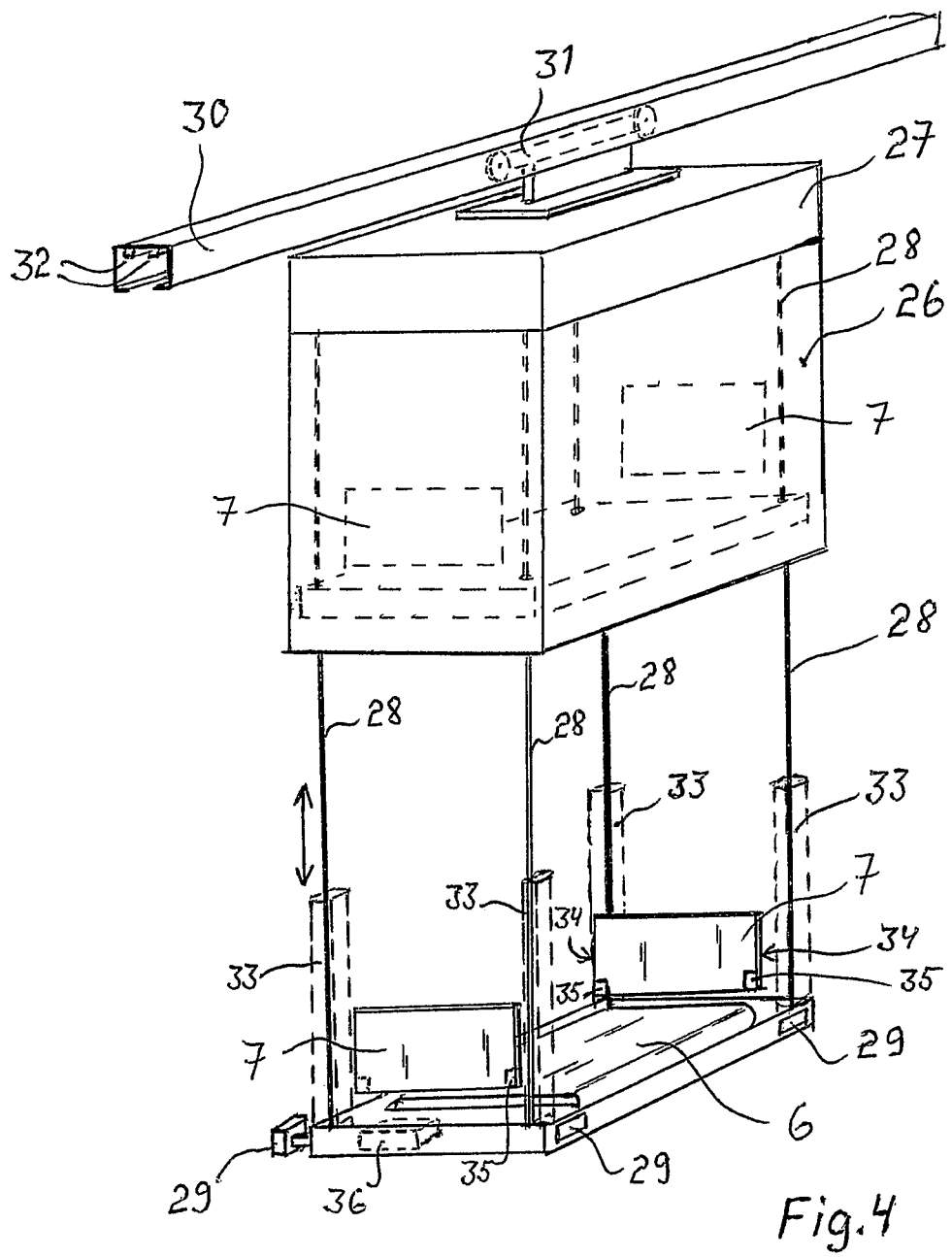
FIG. 4 shows the stacking and retrieving robot travelling on overhead rails.

FIG. 1 shows the receiving and delivery station 5, which includes a conveyor belt 2 onto which the brought goods package is placed The package is whatever article packed or unpacked, which stays put not rolling off its base. The one who brings the package or the user of the storage is identified with a code that can be fed for instance into computer 22 connected to the station. When the user is identified conveyor belt 2 gets started and moves package 1 to the tunnel in the station, which tunnel comprises the means for control of package. The bar code on package side, RFID code or any other series of characters are read, belt scale 4 weighs the package and camera takes photos of it. The data are taken to the warehouse system as data concerning the said package. If the package weight given in RFID code does not correspond to the weighing result, the reception is rejected. The pattern recognition program determines from the camera picture also the external dimensions of the package. There can also be more cameras taking pictures in different directions. Then the system seeks from the warehouse a place for package 1 and moves it by means of belt 2 to belt 6 of the package collecting robot 19.

Belt 6 of collecting robot 11,12,19, pulls the package between transfer plates 7 of package. In this stage it is also possible by means of transfer plates 7 to pull the package. When package 1 is on belt 6 between transfer plates 7 robot 11,12,19 starts moving along rails 13 in the warehouse. The robot comprises a rail base 12 with wheels. The robot has also high vertical guides 14, resting on which equipment platform 11 is arranged to rise to the height needed. For instance, there are in guides 14 toothed bars, whereby equipment platform 11 comprises rotatable cogwheels, by means of which the equipment platform gets up and down in the guides.

On equipment platform 11 there is still the robot transfer gear part so fixed that it can turn on the equipment platform at least 90° sideways, most suitably to both sides. Thus the robot moving along rails between the racks collects and delivers goods to the racks on both sides of the fairway.

In transfer gear part there are driving gears of transfer plates 7, by means of which plates 7 can be brought closer to and farther away from each other. As equipment there are arms 8 upwards from plates 7, which by means of cylinder 10 are brought closer and farther. Vertical arms 8 are by means of articulated arm 9 fixed to horizontal beam 18, whereby change of distance between plates is possible. Whereas horizontal beam 18 is moved with regard to another fixed beam on the transfer gear part, whereby to transfer plates necessary horizontal motion is achieved. The force of cylinder 10 is so adjusted that it does not squeeze the goods too much. FIG. 1 shows a robot ravelling only on one pair of rails. When in the practise the robot has to work between many possible racks in a rack unit addressed to it, there is in connection with rails 13 a transversal transfer system in the end of the rack row, for instance so that the robot is transferred with another robot to the rails between proper racks. For instance, rails 13 are cut off immediately after the robot, whereby the track-laying under the robot is mounted on a platform movable in crosswise direction.

However, a more recommendable embodiment is of such kind that robot 19 moves by means of its wheels on a smooth base and its control system drives the robot accurately between right racks and in there to right position and further, the unit lifts belt 6 to proper height. By means of this solution the advantage is achieved that for the robot upper part 19 no separate turning means are needed, since the whole robot turns between the racks by means of its wheels.

FIG. 2 shows from one side the bringing of package 1 to rack space 23. With belt 6 it is not possible to accompany the package to the rack, but the final placing into rack must be carried out by means of transfer plates 7. The horizontal motion is formed in FIG. 2 by means of beam 18 furnished with toothed bar 16, which moves in control beam 24 rotated by toothed bar 17. The rack units are chosen for the part of the height of the goods space according to the maximum package size. For instance, a system can be chosen, where the maximum package size is $400 \times 600 \times 600^3$ and weight 50 kg. Between the platform of equipment 11 and transfer gear part there are bearings 25 so that it is possible to go around upper part 19, including its transfer gears, at least to both sides.

FIG. 3 shows the front of a rack, whereby rack spaces 23 are visible from their width. In the warehouse system control of band distribution is recorded, whereby rack spaces 23 comprise for different widths chosen bands a-d according to the width of packages 1a-1d. The system is programmed to fit the packages according to the width so that package 1 can be placed in a free band corresponding well to its width.

FIG. 4 shows a stacking and retrieving robot 26 travelling along a overhead rail 30 by means of wagon 31. The robot comprises a protective casing, into which, by means of cables 28, the goods transporting lower part can be lifted. The lower part can be let down to different levels for stacking and retrieving packages 1, when at first the robot in overhead rail 30 is stopped in the right point. For instance, in overhead rail 30 there is glued in the inner surface a readable location code band, whereby the control circuit of the unit receives all the time data of location on rail 30. There area in rail 30 also power cables, from which the wagon 32 motor gets its motive force. Furthermore, rail 30 possibly comprises also an aerial band for data transmission. For moving gripping plates 7 of the lower part and conveyor belt 6 there is in the lower part a rechargeable battery and driving motors of means 7, 6. The battery is charged from overhead conductor rails 32, when the lower part is lifted up into the upper part casing. Packages 1 stay in the robot ride, when the lower part is lifted up into the casing of the upper part. Encapsulation between lower part and upper part is arranged so that together their encapsulations close at least the package into a casing comprising bottom and sides. Control of wagon 30 contains blocking of movement if the lower part is not lifted up. Transportation of packages is safe, if they move on an manned area.

When the lower part is let down to wanted rack, for instance determined by control codes, as a solution there are supports 29 locking the lower part and which by means power units are pushed against the frames of racks 15, so that the lower part is locked to its place, when packages are moved from lower part to the rack and vice versa. Supports 29 work also as lower part power source, as by means of a battery placed in the rack frame For instance, in order to secure working, the lower part has a rack location detector, so that lower part can be steered just to the right height. The detector is, for instance by means of ultra sound, detecting the location of the rack frame. The front edges of gripping plates 7 are in their both directions furnished with a collision sensor 34, which is for instance a piezo film. The sensor informs if the front edge of plate 7 hits the package. Furthermore, the front edges of gripping plates 7 can have light cells 34 which indicate arriving of package between the gripping plates or leaving of package from between the gripping plates. Furthermore, in one embodiment the lower part can be furnished with a horizontal net curtain between vertical beams 33. The net curtain indicates when a package or other obstacle is in immediate closeness of the lower part side, so that lifting of lower part does not necessarily work in the space between the rack. The net curtain is needed mainly on the lower part sides, via which loading of package is running The lower part includes also a battery 36 as power source of lower part equipment. Naturally, the above mentioned equipment and properties can be adapted to gripping plates 7 of robot 19 of FIG. 1 and to the transfer opening and side parts of the package.

Figure 5:
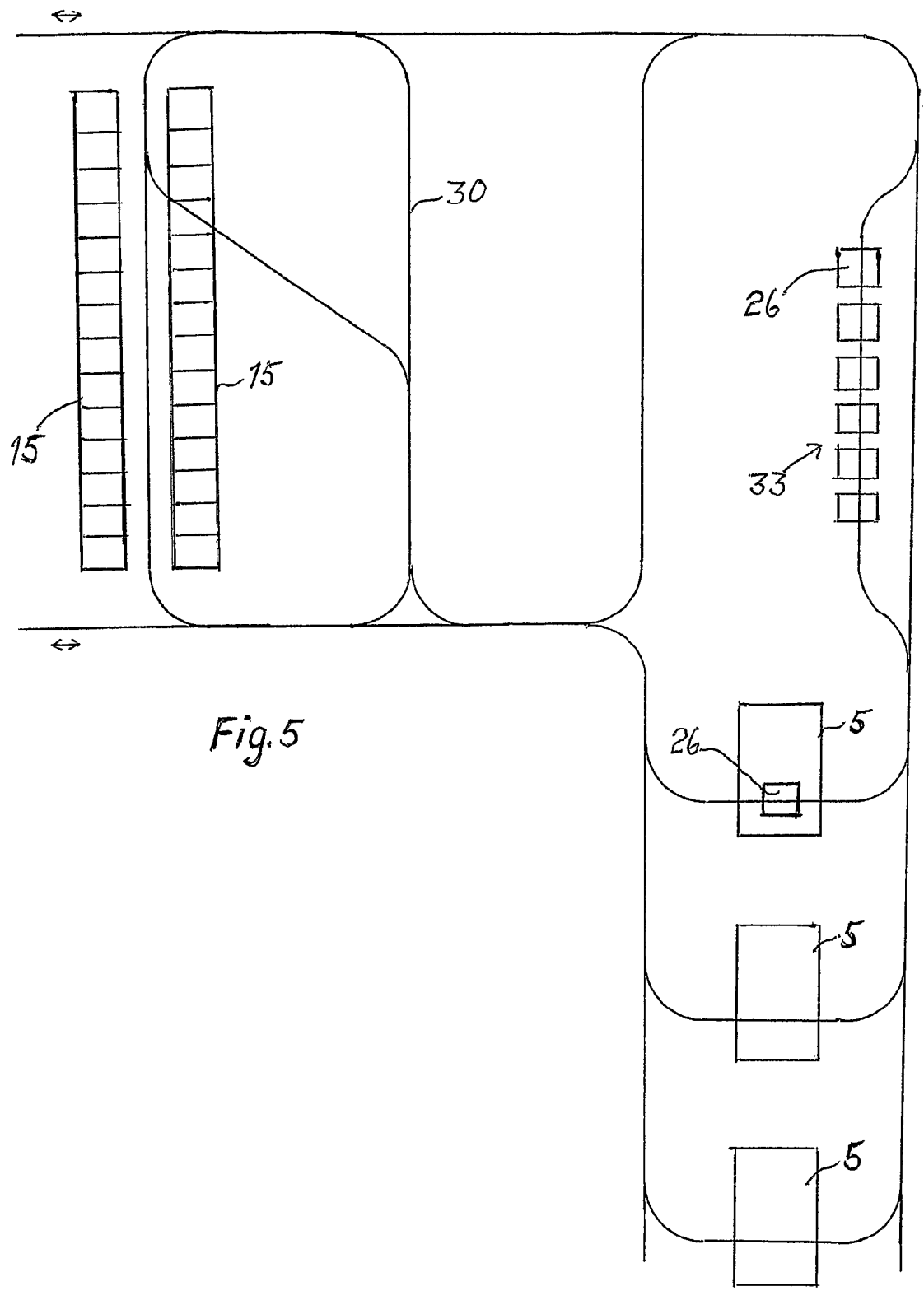
FIG. 5 shows schematically a rail of the warehouse rail system from above.

FIG. 5 is a schematic view of overhead track-laying 30, along which robots 26 can be steered to move to or to get stored to depot area 33. As example in the scheme one rack area, one depot area 33 and three reception and delivery stations 5 are presented. Rack units 15 are most suitably under overhead rail 30 so much that the track of collecting robot can cross the rack units, Several robots 26 are programmed to move at the same time on rails 30 and the program takes care every moment of the location of the robots and seeks the best routes.

The data system reception and delivery stations 5 transmits and receives over computer 22 electric data together with central server 21 physically in a different place. Whereas the central server continuously communicates electrically with suppliers and with the operation system of the customer. Naturally, computer 22 in connection with the unit, can also be communicating directly with suppliers or buyers By supply of goods the supplier furnishes the package with RFID remote code and sends electrically the data of RFID code 20 to the warehouse data system. The RFID remote code is usually a stick-on label and contains order data, quantity data, ID number and possibly also other data, as for instance data of the cargo destination. When the package arrives at the warehouse rack station, choosing of package location in rack 15 is effected by the weight of the package and possibly also the demand of quick collection of package.

The data system included in the method controls the logistics of package 1, by which communication electronic mail address is used and by means of which access to the web sides received, whereby by means of communication, as an electrical form, the goods (package) are ordered from the supplier, the system types the carriage note and orders freight and transport and invoices the transportation. The system informs the supplier of arrival of the goods, transmits the chosen location of the goods (package) in the warehouse rack to the data system, updates the warehouse situation, forms invoice data and also of collection and sending of goods (package) from warehouse rack 15 to the customer according to the order received from customer in using correspondingly the above presented necessary functions.

If the goods (package) are collected from rack 15 for own use on the basis of a collection order, the control of logistics updates the content of stock, gives, if necessary, an order impulse, due to the reduction of the goods in question, and points the reduced goods to charge the work number or corresponding identified in the collection order.

The invention claimed is:

1. Equipment to stack palletless packages by a variable size of each package on racks in a warehouse and subsequently for retrieving the packages from the racks, and to control logistics of the stacked packages, said equipment comprising:
   a rack unit in a warehouse,
   a data system,
   at least one reception and delivery station which includes detectors of a package, and
   a communication arrangement to the data system,
   an overhead rail system of the warehouse,
   a moving robot which moves on the overhead rail system and which stacks and retrieves packages relative to the rack unit, the stacking and retrieving robot including
      moving equipment for movement on rails of the rail system,
      locating equipment to locate the moving robot on a selected rail,
      an encapsulating upper part and a goods transporting lower part, wherein in a protected position the upper part encapsulates the lower part together with any package thereon,
      lifting equipment which, relative to the upper part, selectively lets down the goods transporting part to different rack levels and lifts up the goods transporting part to the protected position,
      a transfer device in the lower part which moves a package thereon selectively onto the lower part or away from the lower part, and
      a lock which locks at least a bottom and sides of a package receiving space of the lower part when the lower part is lifted to the protected position in the upper part.

2. Equipment according to claim 1, further comprising a blocking arrangement which prevents movement of the package on a rail if the lower part is not lifted up to the protected position in the upper part.

3. Equipment according to claim 1, wherein the lifting equipment includes lifting cables.

* * * * *